United States Patent
Nagase et al.

(10) Patent No.: US 6,948,042 B2
(45) Date of Patent: Sep. 20, 2005

(54) HIERARCHICAL STORAGE APPARATUS AND CONTROL APPARATUS THEREOF

(75) Inventors: Norikazu Nagase, Odawara (JP); Seiichi Higaki, Odawara (JP); Takao Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 290 days.

(21) Appl. No.: 10/347,118

(22) Filed: Jan. 17, 2003

(65) Prior Publication Data

US 2003/0140207 A1 Jul. 24, 2003

(30) Foreign Application Priority Data

Jan. 21, 2002 (JP) ....................................... 2002-010957

(51) Int. Cl.⁷ .............................................. G06F 12/06
(52) U.S. Cl. ...................................... 711/167; 711/117
(58) Field of Search ............................... 711/167, 114, 711/112, 113, 117; 709/220, 223

(56) References Cited

U.S. PATENT DOCUMENTS

| | | | |
|---|---|---|---|
| 5,459,848 A | | 10/1995 | Mase |
| 5,495,457 A | | 2/1996 | Takagi |
| 5,528,048 A | * | 6/1996 | Oae et al. ............... 250/492.22 |
| 5,774,682 A | * | 6/1998 | Benhase et al. ............ 711/118 |
| 5,893,139 A | * | 4/1999 | Kamiyama ................... 711/117 |
| 6,073,209 A | * | 6/2000 | Bergsten ...................... 711/114 |
| 6,085,193 A | | 7/2000 | Malkin et al. |
| 6,131,147 A | | 10/2000 | Takagi |
| 6,311,252 B1 | * | 10/2001 | Raz ............................ 711/117 |
| 2002/0138642 A1 | * | 9/2002 | Miyazawa et al. .......... 709/232 |
| 2003/0110350 A1 | * | 6/2003 | McGee et al. ............... 711/108 |

FOREIGN PATENT DOCUMENTS

JP    09-16455 A    1/1997

OTHER PUBLICATIONS

Salasin "Hierarchical Storage in Information Retrieval," Communications of the ACM 16: 291–295 (1973).
Smith "Long Term File Migration: Development and Evaluation of Algorithms," Communications of the ACM 24:521–532 (1981).

* cited by examiner

Primary Examiner—Pierre-Michel Bataille
(74) Attorney, Agent, or Firm—Townsend and Townsend and Crew LLP

(57) ABSTRACT

A method for managing data stored in a hierarchical storage unit of a storage apparatus is disclosed. The storage unit includes a first storage medium having a first access speed and a second storage medium having a second access speed. The first access speed is different from the second access speed. The method comprises determining a first access frequency for information of first type, the first access frequency being associated with a first period of past time. A second access frequency of the information of first type is determined. The second access frequency is associated with a second period of past time and is different than the first access frequency. At least a portion of the information of first type is transferred from the first storage medium to the second storage medium prior to a second period based on the second access frequency determined in the determining-a-second-access-frequency step, the second period corresponding to the second period of past time.

20 Claims, 7 Drawing Sheets

| DATA BLOCK ID | THE NUMBER OF ACCESS | | | |
| --- | --- | --- | --- | --- |
| | UNIT TIME 1 | UNIT TIME 2 | ·· | |
| 0002001 | 201 | 25 | : | |
| | : | : | | |

| DATA BLOCK | HIERARCHY A | HIERARCHY B | HIERARCHY C | HIERARCHY D |
|---|---|---|---|---|
| 1 | 0 | 1 | 0 | 0 |
| 2 | 1 | 0 | 0 | 0 |
| ⋮ | ⋮ | ⋮ | ⋮ | ⋮ |
| TOTAL | 300 | 30000 | 9000 | 7000 |

HIERARCHICAL STORAGE APPARATUS AND CONTROL APPARATUS THEREOF

CROSS-REFERENCES TO RELATED APPLICATIONS

The present application is related to and claims priority from Japanese Patent Application No. 2002-010957, filed on Jan. 21, 2002.

BACKGROUND OF THE INVENTION

The present invention relates to storage apparatus and hierarchical data management thereof.

Figure 1:
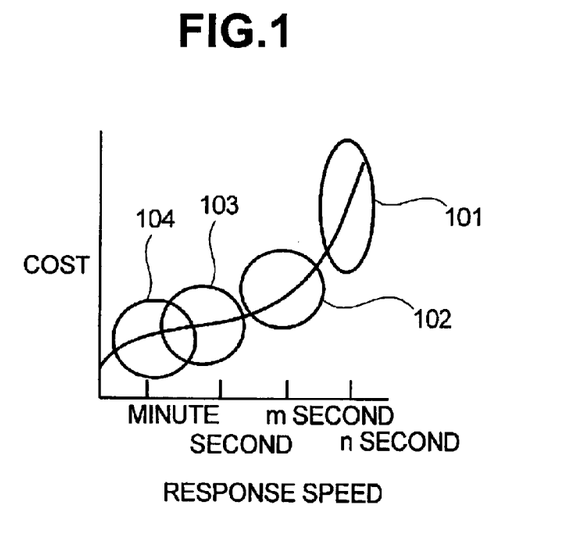
FIG. 1 illustrates a graph providing information about various types of storage devices and their access speeds in a storage hierarchy.

The cost of storage devices generally corresponds to their speed; faster the device more expensive it is. FIG. 1 provides information about the costs of a plurality of storage devices with respective to their access speed. For example, a semiconductor memory 101 has response speed ranging from nano-seconds to mili-seconds unit, providing extremely fast access speed. On the other hand, in a magnetic tape device 104 has response speed ranging from few seconds to a minute or so, providing relatively low access speed. However, the storage cost per unit of information a magnetic tape is significantly less than (about one several tenth) that of the semiconductor memory. Other storage media, an optical disk storage device 102 and magnetic tape storage device 103, fall somewhere in between the semiconductor device and magnetic tape device in terms of access speed as well as their cost.

Generally, different data have different access frequencies, some being accessed significantly more frequently than other data. Accordingly, the data having a high access frequency are stored in a high speed storage medium, and those having a low access frequency are stored in a low speed storage medium, so that the storage system can be more efficiently utilized.

A hierarchical storage apparatus refers to a storage system having a plurality of storage devices having different access speed, so that the storage apparatus may store frequently accessed information in a high speed storage device and less frequently accessed information in a lower speed storage device. As used herein, the term "storage apparatus" refers to any device having storage capability. Examples of the storage apparatus includes a disk array device including a plurality of disk drives, a storage subsystem including a storage controller and a storage device configured to store data, a storage system including an information processing unit coupled to a storage device via communication link, a disk drive, and a CD-ROM. The terms, "storage subsystem" and "storage system" are used interchangeably herein unless specifically excluded from the context. For example, in certain instances, the storage system refers to a system including a storage subsystem, e.g., the storage subsystem is a disk array device and the storage system is a network system including the disk array device.

Various methods have been proposed for transferring data between respective storage media within a hierarchical storage apparatus. One method involves moving data stored in a high speed device to a lower speed device if a predetermined time has elapsed without the data being accessed. In another method, higher priority data are allocated to a higher speed storage medium and lower priority data are allocated to a lower speed storage medium.

BRIEF SUMMARY OF THE INVENTION

The conventional methods above do not address those data that are accessed and used cyclically, e.g., those that are accessed daily, weekly, monthly, bimonthly, annually, and the like. Since these types of data have few accesses other than a given period of time, they are moved to the low speed storage medium. Accordingly, the storage apparatus cannot provide high speed data access when those data are eventually accessed since they are stored in the low speed storage medium. In addition, a large amount of such data may be needed within a short period of time, e.g., information needed to give monthly salaries to employees. These spikes in accesses may cause a bottleneck in the storage apparatus. Once these cyclical data have been moved to the high-speed storage device, they remain there for a predetermined time after the cyclic access period has elapsed. During that interval or write time, a portion of the high speed storage device storing the cyclical data is not utilized efficiently since that portion cannot load other data blocks that are being accessed at higher frequencies.

In one embodiment, a hierarchical storage apparatus is configured to perform a transition prediction of access frequency of data or data block, so that cyclically-used data are transferred to a high speed storage device in advance of its actual access. The apparatus may also be configured to remove the cyclically-used data once the cyclical period has elapsed without waiting for a predetermined time of inactivity, thereby enabling the high speed storage device to be more efficiently utilized. This anticipated data loading or migration method to appropriate device types is not limited to cyclically-used data.

In one embodiment, a method for managing data stored in a hierarchical storage unit of a storage apparatus is disclosed. The storage unit includes a first storage medium having a first access speed and a second storage medium having a second access speed. The first access speed is different from the second access speed. The method comprises providing information of first type in the first storage medium prior to a first period, the first storage medium being associated with a first access frequency range; and transferring at least a portion of the information of first type from the first storage medium to the second storage medium prior to a second period based on an expected access frequency during the second period, the second storage medium being associated with a second access frequency range, the expected access frequency being within the second access frequency range.

In one embodiment, a method for managing data stored in a hierarchical storage unit of a storage apparatus is disclosed. The storage unit includes a first storage medium having a first access speed and a second storage medium having a second access speed. The first access speed is different from the second access speed. The method comprises determining a first access frequency for information of first type, the first access frequency being associated with a first period of past time. A second access frequency of the information of first type is determined. The second access frequency is associated with a second period of past time and is different than the first access frequency. At least a portion of the information of first type is transferred from the first storage medium to the second storage medium prior to a second period based on the second access frequency determined in the determining-a-second-access-frequency step, the second period corresponding to the second period of past time.

In another embodiment, a storage apparatus includes a hierarchical storage unit including a first storage device having a first access speed and a second storage device having a second access speed. The first access speed is different than the second access speed. A storage controller is coupled to the storage unit, the controller including a processor to handle a data transfer request to the storage unit. A first computer readable medium includes code for providing information of first type in the first storage medium prior to a first period, the first storage medium being associated with a first access frequency range; and code for transferring at least a portion of the information of first type from the first storage medium to the second storage medium prior to a second period based on an expected access frequency during the second period, the second storage medium being associated with a second access frequency range, the expected access frequency being within the second access frequency range.

DETAILED DESCRIPTION OF THE INVENTION

Figure 2:
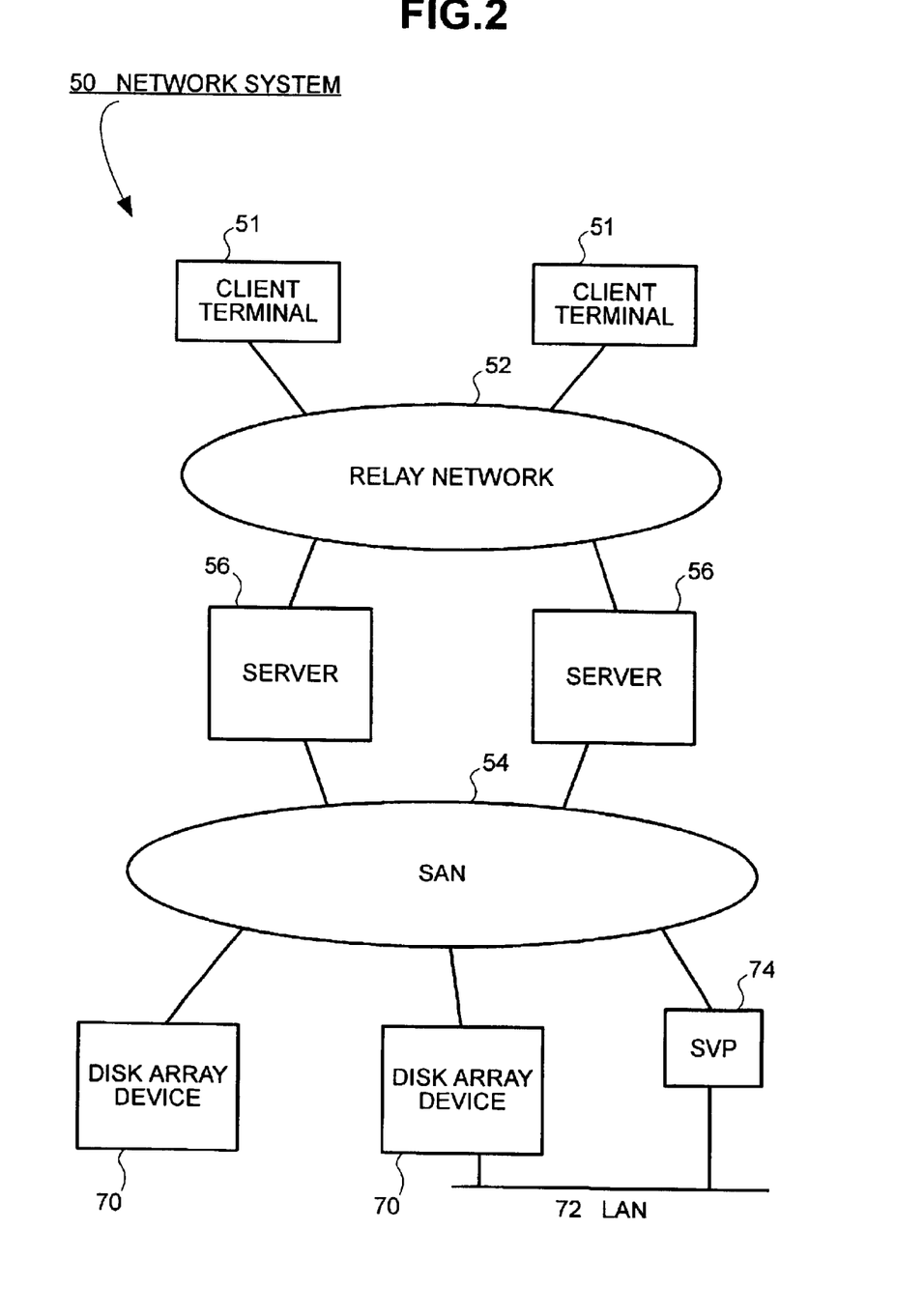
FIG. 2 is a schematic diagram of a network system having a storage hierarchy according to one embodiment of the present invention.

FIG. 2 schematically illustrates a network system 50 including one or more messaging networks 52 and a storage area network ("SAN") 54 connecting a plurality of servers 56 to a plurality of hierarchical storage apparatuses or subsystems 70. The network 52 may be a local area network, a wide area network, the Internet, or the like. The network 52 enables, if desired, the hierarchical storage apparatuses 70 to be centralized and the servers 56 to be clustered for easier and less expensive administration. As used herein, the term "storage subsystem" refers to a storage unit configured to be coupled to one or more external information processing units and provide a storage area to the external information processing units, wherein the storage unit includes one or more storage controllers and one or more storage components (e.g., disk drives) configured to store information.

The SAN 54 supports direct, high-speed data transfers between servers 56 and storage apparatuses 70 in various ways. Data may be transferred between the servers and storage apparatuses. A particular storage apparatus may be accessed serially or concurrently by a plurality of servers. Data may be transferred between servers. Alternatively, data may be transferred between the storage apparatuses 70, which enables data to be transferred without server intervention, thereby freeing server for other activities. For example, a storage apparatus may back up its data to another storage system at predetermined intervals without server intervention.

Accordingly, the hierarchical storage apparatuses or subsystems 70 is not dedicated to a particular server bus but is attached directly to the SAN 44. The storage subsystems 70 are externalized and functionally distributed across the entire organization.

In one embodiment, the SAN 54 is constructed from storage interfaces and is coupled to the network 52 via the servers 56. Accordingly, the SAN may be referred to as the network behind the server or sub-network. Although the storage subsystem 70 has been described using the SAN environment, it may be provided in other network environment, e.g., a network area storage (NAS) environment.

The network system 50 also includes a service processor or management agent 74 coupled to the SAN according to one embodiment of the present invention. The service processor 74 is a data processing system, e.g., a computer, that is used to monitor the operating status of the storage subsystem and HDDs provided therein and to perform other management related functions, such as replacing or upgrading HDDs. The service processor 74 includes a display area that provides a graphic user interface ("GUI") that a network administrator can use to manage the storage subsystem according to one embodiment of the present invention.

Figure 3:
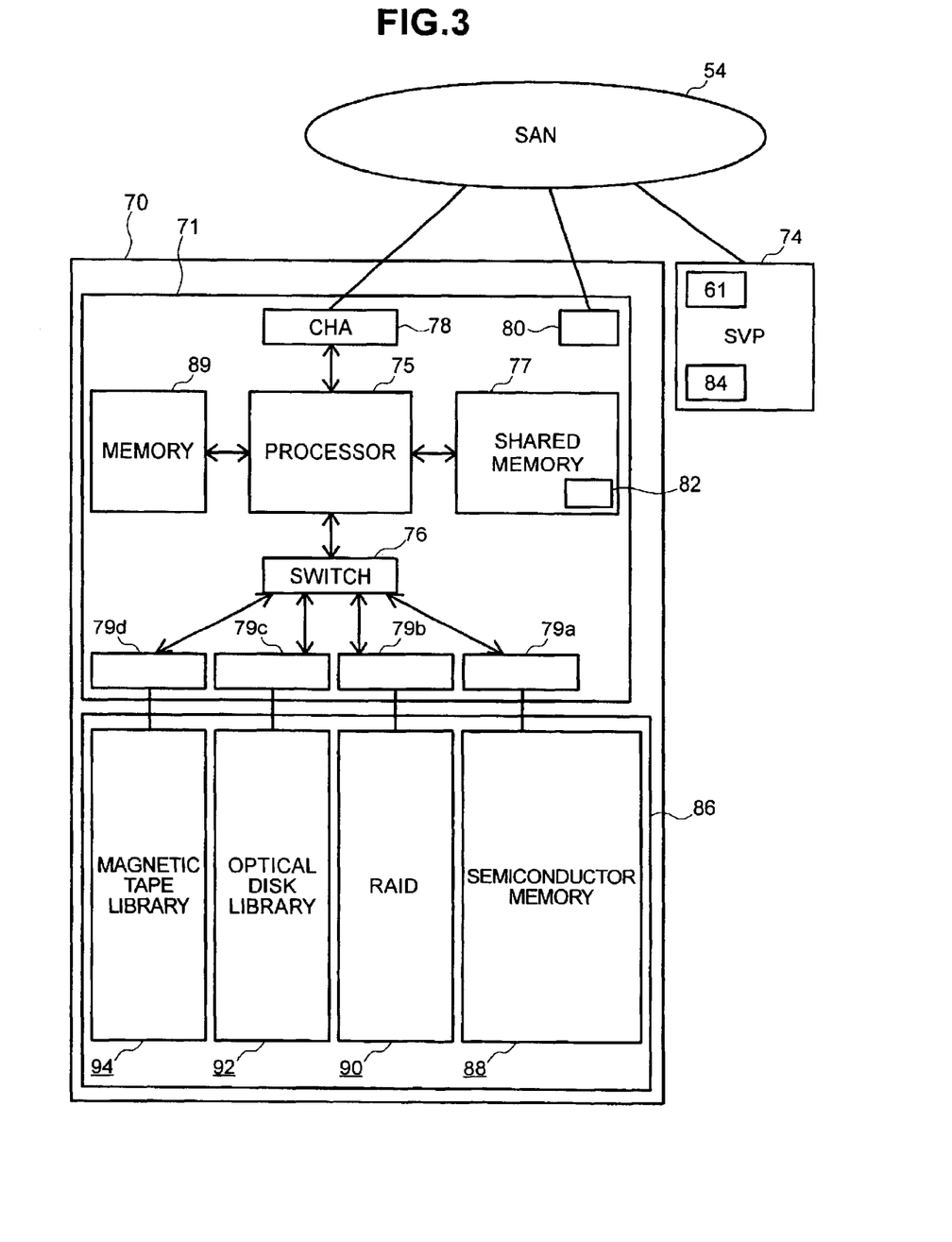
FIG. 3 illustrates a schematic diagram of a disk array device of the network system of FIG. 2.

FIG. 3 illustrates a schematic configuration of the hierarchical storage subsystem 70 and SVP 74. The storage subsystem 70 includes a storage controller 71 and a storage area 86 having a plurality of storage devices of different types having different access speeds. The storage area 86 includes a semiconductor memory 88, a disk array 90 provided in a Redundant Array of Inexpensive Disks (RAID) format, an optical disk library 92, and a magnetic tape library 94, as will be explained in more detail later.

The controller 71 controls or regulates information being exchanged between an external device and the storage area 86. The controller 71 comprises a processor 75, a switch 76, a shared memory 77, a channel adapter ("CHA") 78, a storage adapter 79, and a SVP connection adapter 80, and a memory 89. The processor 75 is connected to the switch 76, memory 77, CHA 78, and SVP connection adapter 80. The processor controls the controller 71 and the information being processed therein. The switch 76 is connected to the processor 75 and a plurality of storage adapter 79 to enable information to be communicated among these devices. The memory 77 contains a storage correspondence table 82 including address information of the storage devices in the storage area 86.

The CHA 78 is coupled to the SAN 54 and serves as a communication interface between the SAN and the storage controller 71. The storage adopter 79 is coupled to the storage area 86 and serves as a communication interface between the controller 71 and the storage. In the present embodiment, the storage adopter 79 includes a plurality of adapters 79a–79d, where the adapter 79a is coupled to the semiconductor memory 88, the adapter 79b is coupled to the RAID 90, the adapter 79c is coupled to the optical disk library, and the adapter 79d is coupled to the magnetic tape library 94. In one embodiment, a single storage adapter is coupled to more than one type of storage devices. In another embodiment, a plurality of storage adapters is coupled to one type of storage device.

The SVP connection adapter 80 is coupled to the SAN 54 and transmits information to or receives information from the SVP 74 via the SAN 54. In one embodiment, the SVP 74 is coupled to the disk controller 71 via a local area network ("LAN"), as shown in FIG. 2, in which case the SVP connection adopter 80 is coupled to the LAN. The SVP 74 comprises an input device or means 61, such as a keyboard, mouse, or touchpad, a display screen 62, and a storage management program 84 used for managing the HDDs in the disk array 70.

Figure 4:
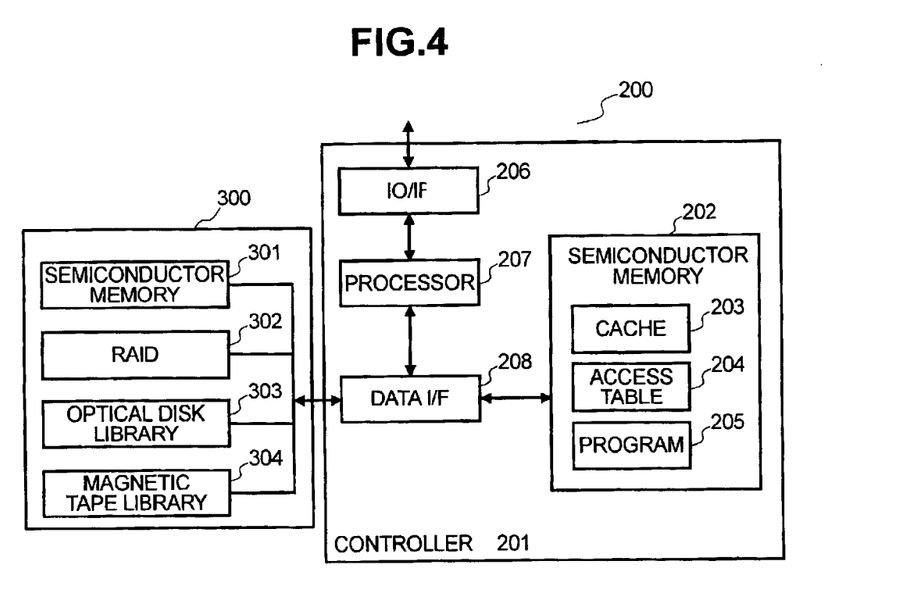
FIG. 4 is a schematic view of a hierarchical storage apparatus according to one embodiment of the present invention.

FIG. 4 illustrates a schematic view of a hierarchical storage apparatus or subsystem 200 according to one embodiment of the present invention. The storage subsystem 200 is a simplified view of the storage subsystem 70 in FIG. 3. The storage subsystem 200 comprises a controller 201 and a storage area 300. The storage area 300 includes a semiconductor memory 301 having a first data access speed, a RAID 302 having a second data access speed, an optical disk library 303 having a third data access speed, and a magnetic tape library 304 having a fourth data access speed. Generally, the semiconductor memory 301 has the fastest access speed; the RAID 302 has the second fastest speed; the optical disk library 303 has the third fastest speed; and the magnetic tape library 304 has the least fastest speed. In one embodiment, the storage subsystem 200 includes only two types of storage devices, a storage device of first speed (e.g., the semiconductor memory 301) and a storage device of a second speed (e.g., the RAID 302).

The storage area 300 is referred as "hierarchical storage area" or "hierarchical storage media," where data are stored in different store device types according to their access frequency. Generally, the most frequently accessed data are stored in the semiconductor memory 301 having the fastest access speed, and the second most frequently accessed data are stored in the RAID 302 having the next fastest access speed. Less frequently accessed data are stored in the optical disk library 303 and magnetic tape library 304 that are relatively slower storage devices. As used herein, the term "hierarchical storage area" or "hierarchical storage media" refers to a storage unit, storage area or database having storage devices with different data access speeds.

The controller 201 includes a communication interface 206, a processor 207, a data interface 208, and a memory 202. The storage controller 201 handles read and write requests to the various storage devices 301, 302, 303 and 304 provided in the hierarchical storage area 300. The controller 201 receives write request and read request from a one or more hosts (e.g., the server 56 or client 51) via the interface 206 (corresponding to CHA 78), and temporarily stores a corresponding data block in a cache memory 203 provided in the memory 202. The memory 202 is a semiconductor device in one embodiment. The memory 202 may include a program 205 to provide instructions in handling the data request operation above. The processor 207 processes the data requests according to the instructions provided by the program 205. The data are written to or read from the storage area 300 via the data interface 208 (corresponding to the storage adapter 79). In one embodiment, the semiconductor memory 301 and the memory 202 is the same device or module.

The controller 201 also includes an access table 204 maintaining records of number of accesses made to data blocks in the storage area 300 over a given period of time. The access table 204 is provided in the memory 202 in the present embodiment. The table 204 is depicted in FIG. 3.

Figure 5:
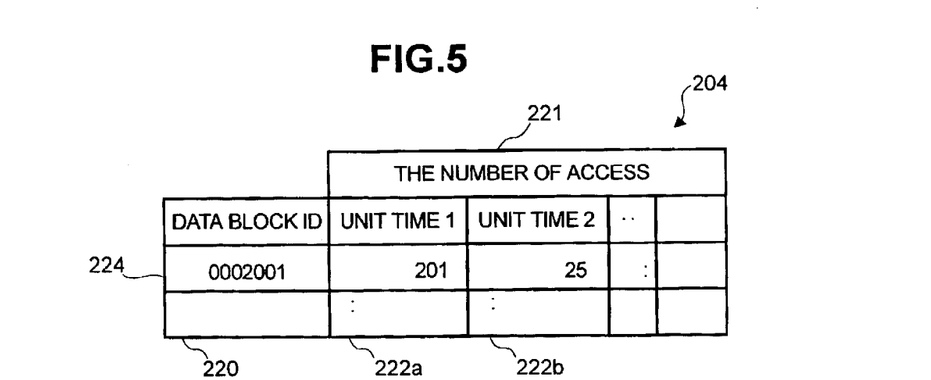
FIG. 5 is an access record list of a data block according to one embodiment of the present invention.

The table 204 includes a data block ID column 220 and a number of access section 221. The data block ID column 220 contains unique identification numbers for data blocks in the storage area according to one embodiment of the present invention. The number of access section 221 includes a plurality of columns 222 representing units of time in certain time periods. The unit of time may be in a fraction of a second, seconds, hours, days, weeks, months, years, and the like. The unit of time may be adopted according to the configuration of a hierarchical storage apparatus. For example, an extremely epsilon time unit may be used if the hierarchy of a storage medium comprises a semiconductor memory A of first speed (fastest), a semiconductor memory B of second speed (faster), and a semiconductor memory C of third speed (fast).

Each column in the section 221 represents a different time period. For example, the column (or unit time 1) 222a represents the month of January, and the column (or unit time 2) 222b represents the month of February, and so on. Alternatively, the column 222a may represent the first day of January, and the column 222b may represent the second day of January, and so on. A record 224 indicates that the data block 0002001 has been accessed 201 times during the unit time 1 and 25 times during the unit time 2. In one embodiment, the units of time can be grouped to represent any cyclic period of time, e.g., one-second cycle, five-minute cycle, one-month cycle, seven-month cycle, and the like, as desired by a storage administrator.

In one embodiment, the access table 204 is generated as write or read requests are received and handled by the controller 201 according to the program 205. That is, each time a new data block is accessed, a new access record is created in the table 204. The data block that has been accessed is temporarily stored in the cache memory 203 or in a RAID 302 if the cache is not available.

If an access record for the accessed block already exists in the table 204, an access count in the appropriate column 222 is incremented by one. For example, if the data block has been accessed in February, the access count in a column 222 corresponding to that month is incremented by one. In addition, the storage controller 201 attempts to retrieve the data block in question in accordance with the request. The search for the data block may be performed after updating the table 204 or in parallel or prior to the update operation. Generally, a storage medium having faster access speed is examined before a storage medium having slower access speed. In one embodiment, the cache 203 is first searched for the data block, then the semiconductor memory 301, and then the RAID 302. If the data block is located in one of these fast storage devices, then the data block is retrieved to handle the request from the host.

However, if the data block is not located in any of these fast storage devices, the search proceeds to the slower storage devices, the optical disk library 303 and magnetic tape library 304. Once the data block has been located in the slower storage device, it is transferred to one of the faster storage device, e.g., to the RAID 302. The data block may also be loaded temporarily to the cache 203. If there is insufficient storage space in the cache, the data block may be loaded in the semiconductor memory 301.

Figure 6:
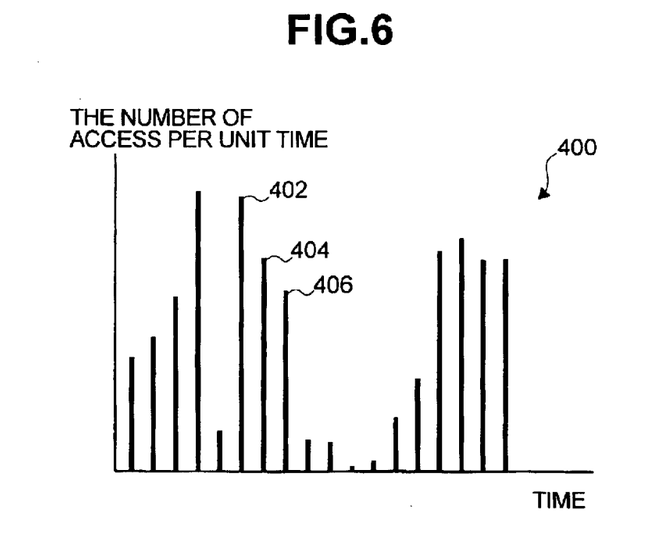
FIG. 6 is a view showing transition of the number of access of a data block according to one embodiment of the present invention.

FIG. 6 shows an access history graph 400 for a given data block that has been generated using the access table 204 according to one embodiment of the present invention. A vertical axis represents the number of access per unit of time. A horizontal axis represents passage of time. The graph 400 includes a plurality of bars 402–406 representing access frequencies of the data block over time. Each bar corresponds to a given period of time. Accordingly, the bar 402 may be referred to a period 402.

The graph 400 can be used to determine to where in the hierarchical storage devices the data block in question is to be loaded in anticipation of the data requests to be received by the hosts, as explained in more detail below.

Figure 7:
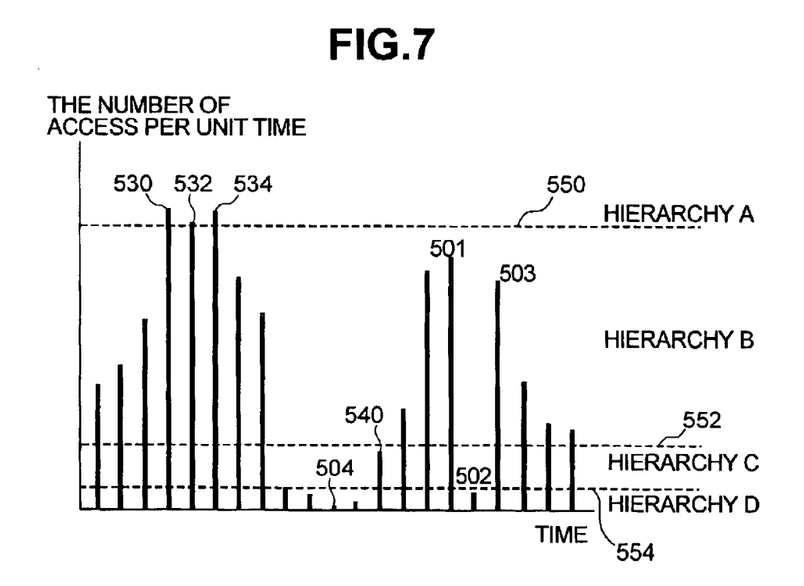
FIG. 7 is a view showing allocation of hierarchical storage mediums based on the number of access according to one embodiment of the present invention.

FIG. 7 shows a case where an allocation determination is based on access frequencies of a data block according to one embodiment of the present invention. The data block preferably belongs in the fastest storage device, e.g., the semiconductor memory 301 or hierarchy A, if the access number exceeds a dotted line 550 per a given time unit (e.g., bars 530, 532, and 534). As explained previously, this time unit may be any unit of time including a fraction of a second and a fraction of a year. The data block preferably belongs in the second fastest storage device, e.g., the RAID 302 or hierarch B, if the access number is between the dotted lines 550 and 552 (e.g., bars 501 and 502). The data block preferably belongs in the third fastest storage device, e.g., the optical disk library 303 or hierarchy C, if the access number is between the dotted lines 552 and 554 (e.g., 540). The data block preferably belongs in the slowest storage device, e.g., the magnetic tape library 304 or hierarchy D, if the access number is less than the dotted line and 554 (e.g., 502 and 504).

Using FIG. 7, the data blocks may be migrated to storage devices of appropriate speed prior to given time periods of access frequencies. For example, the data block may be transferred immediately from the hierarchy C to the hierarchy B after the period corresponding to the bar 540 ends in anticipation of the increased access frequencies for the data block thereafter. Similarly, the data block is migrated from the hierarch A to the hierarch B immediately after the end of a period corresponding to the bar 534 in anticipation of subsequent lower access frequency.

However, in some cases, there may be a sudden sharp rise in access frequency during a short span of time, as illustrated by the bars 502 and 503. The bar 502 is provided in the hierarchy D, and the bar 503 is provided in the hierarchy B. In this case, the total time required to read out the data block is compared with the time required for transferring the data block from the hierarchy D device to the hierarchy B device.

The total time required for reading out the data block, i.e., overhead ("OH"), is obtained from Equation 1 below:

$$OH = S * \{A * (Acc\_T + Acc\_O + Acc\_H) + (Tran\_T + Tran\_O + Tran\_H)\}$$

where,
S: System constant
A: Average command overhead to each storage
Acc_T: Access time[s] of a tape library
Acc_O: Access time[s] of an optical library
Acc_H: Access time[s] of RAID
Tran_T: Transfer time[s] of a tape library
Tran_O: Transfer time[s] of an optical library
Tran_H: Transfer time[s] from RAID The system constant is a value specific to the hierarchical storage apparatus, e.g., based on capacity of a high speed storage, such as the RAID, semiconductor device or cache. The greater the availability, the lower the system constant. If the OH is greater than the unit of time, the data block is left in the hierarch D device and not transferred to the hierarchy B device since the time to access the data block from the point 502 to the point 503 would be reached in less time than the OH. However, the data block may be transferred from the hierarchy D device to the hierarchy C device in such a case. Accordingly, it is possible to prevent issuing of unnecessary commands and use of resources by using the data block transfer method above.

In another situation, the storage subsystem 200 may experience a wild fluctuation in access frequencies within a relatively short period of time, as indicated by the bars 501, 502, and 503. The accessed frequency for the data block is quite high for the bar 501. Then at the next unit of time, for the bar 502, the access frequency drops dramatically. Thereafter, the access frequency increases dramatically for the bar 503.

In such a situation, the storage subsystem needs to determine whether or not it is efficient to transfer the data block from the hierarchical B device to the hierarchical D device and then back to the hierarchical B device.

Equation 2 below is used for such a determination according to one embodiment.

$$\text{Threshold Value}[t] = 1st\_OH + Tb + 2nd_{13} OH$$

where,
1st_OH: Overhead of movement from unit time 501 to unit time 502 Tb: Length of time
the data block remains in a slow storage device
2nd_OH: Overhead of movement from unit time 502 to unit time 503
The $1^{st}\_OH$ and $2^{nd}\_OH$ are values obtained using Equation 1.

Figure 8:
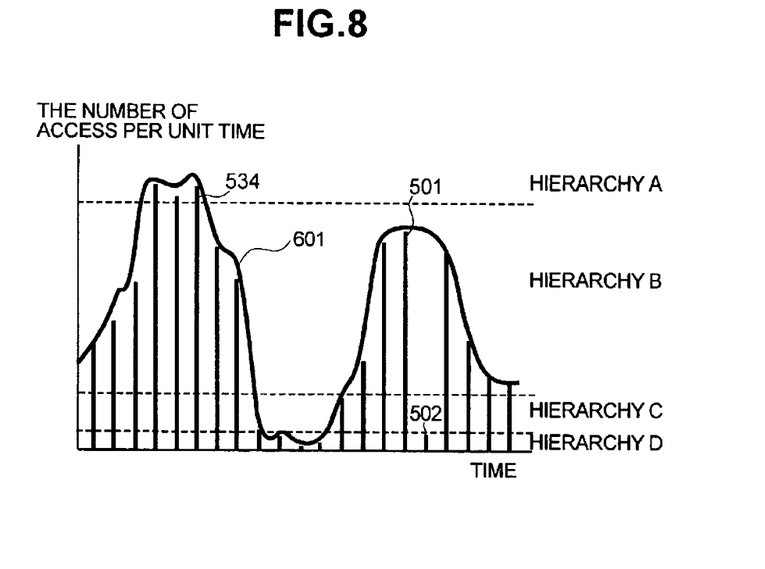
FIG. 8 shows one example of access cycle of a data block obtained according to one embodiment of the present invention.

FIG. 8 shows a curve 601 obtained from using Equations 1 and 2 according to one embodiment of the present invention. The curve may be used to determine whether or not the data block is to be migrated to another hierarchy in anticipation of the change in access frequency. For example, the data block is moved from the hierarchy A immediately after the bar or period 534; however, the data block is left in the hierarchy B after the period 501. In one embodiment, at time before and after the periods shown, the cyclical variation in the number of access checked by looking for repetition of this curve shape. For example, if the curve 601 represents a monthly cycle, then similar curves from other months are examined to determine the accuracy of the curve 601 for predicting data access frequency. After the transition graph of this number of access has been obtained using the table 204 and the graph in FIG. 7, the data block is moved to the appropriate hierarchical storage devices over the periods corresponding to the time units in FIG. 8.

In one embodiment, the data block is migrated to different hierarchies automatically using the curve 601 by triggering a write command each time curve transition from one hierarchy to another.

In addition, in case that control for moving data block between storages in each hierarchy in accordance with this graph is not carried out at an opportunity when the data block is accessed but is accessed immediately when timing for changing hierarchy of storage comes on the graph, at the time when access frequency of its data block is heightened in fact, the data block exists in a storage medium which is hierarchically positioned as the high speed storage medium. Further, by biasing this graph by a predetermined period, it becomes possible to optimize an allocation of a data block before the number of access to a data block varies in fact.

Figure 9:
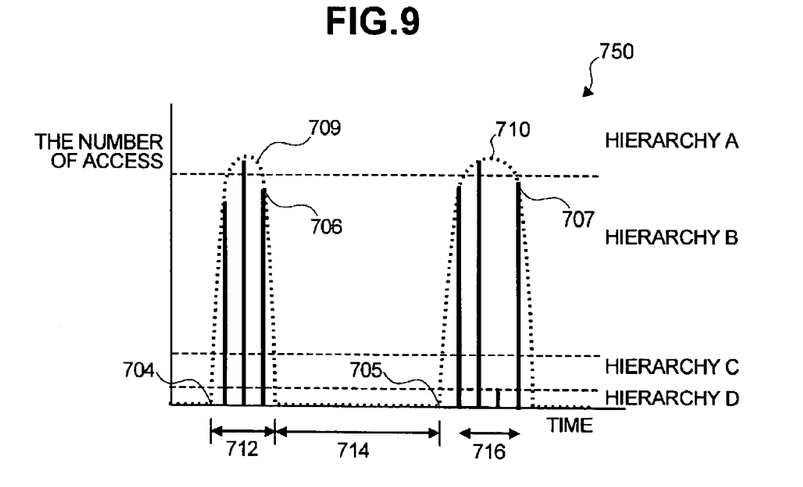
FIG. 9 is a view showing another example of access cycle of a data block obtained according to one embodiment of the present invention.

FIG. 9 shows a graph 750 that has been adjusted to differentiate high access frequency periods from low access frequency periods according to one embodiment of the present invention. The x-axis represents time and includes a plurality periods 712, 714, and 716, each including a plurality of time units. High-access-frequency periods are defines by dotted lines 709 and 710 and correspond to the periods 712 and 716.

In operation, the data block is transferred to a fast storage medium, e.g., the semiconductor memory 301, prior to a point 704 of the high access periods, so that the storage apparatus would be ready to handle the numerous data requests that are expected during the time period 712. After the first high frequency period 712, the data block is promptly transferred to a slower storage without waiting for a predetermined period of low access frequency, as in convention methods, thereby freeing the fast storage device for other data blocks that may more efficiently utilize the fast storage device. Thereafter, the data block is again transferred to a fast storage device prior to a point 705 in anticipation of the high access frequency period 716.

In one embodiment, the graph 750 is modified or updated after a predetermined period to better reflect the actual access number history.

A feedback quantity in unit time is represented by the following formula.

$$FB=(Org_{13} V-New\_V)*SA$$

SA: Weighting constant
Org__V: the number of access currently in use in access cycle
New__V: Newly obtained number of access The weighting constant SA is a value used to compensate factors affecting the access time or frequency, or both. This includes the changes relating to access characteristics and data processing system (e.g., software change).

Figure 10:
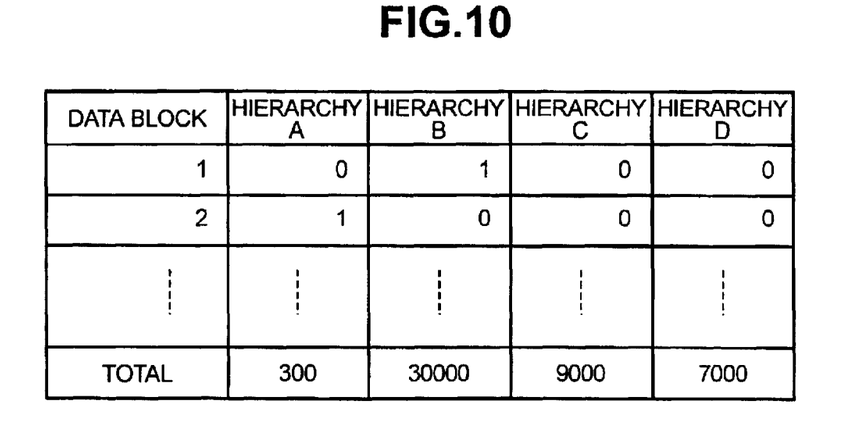
FIG. 10 is a list of structural storage use quantity according to one embodiment of the present invention.

By the foregoing, summation of access state of each data block obtained is calculated so that it is possible to predict use capacity to a storage medium of each hierarchy. This calculation of use quantity prediction is carried out by a variation prediction mechanism, which comprises a CPU in the controller and a micro-program executed by the CPU.

The embodiments above may be used in connection with a data group including a plurality of data blocks.

In one embodiment, the data migration based on predicted access frequency may be used for non-cyclical data. That is, the present invention may be used for data that are linked to random events, e.g., stock prices, earthquake, and the like, as long as there is a correlation between the data access frequency and a given event exists.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A method for managing data stored in a hierarchical storage unit of a storage apparatus, the storage unit including a first storage medium having a first access speed and a second storage medium having a second access speed, the first access speed being different from the second access speed, the method comprising:
    determining a first access frequency for information of first type using an access table maintained by a storage controller of the storage apparatus, the first access frequency being associated with a first period in the past, the storage apparatus being coupled to a remote host system that is configured to access the storage unit of the storage apparatus via a network;
    determining a second access frequency of the information of first type using the access table, the second access frequency being associated with a second period in the past, the second access frequency being different than the first access frequency; and
    transferring at least a portion of the information of first type from the first storage medium to the second storage medium prior to a second point in time based on the second access frequency determined in the determining-a-second-access-frequency step, the second point in time being associated with the second period in the past,
    wherein the second point in time and the second period in the past have a common characteristic that is perceived as affecting access frequency of the information of first type.
    wherein the access table associates a plurality of periods of time for the information of first type, each period being associated with a number of access requests received for the information of first type for that period.

2. The method of claim 1, wherein the first storage medium is associated with a first access frequency range and the second storage medium is associated with a second access frequency range, the first access frequency being within the first access frequency range and the second access frequency being within the second access frequency range, where the determining steps and transferring steps are performed by the storage controller, wherein the second point in time is a recurring event.

3. The method of claim 1, further comprising:
    providing the information of first type in the first storage medium that is associated with the first access frequency prior to a first point in time, the first point in time being associated with the first period in the past,
    wherein the first storage medium is associated the first access frequency and the second storage medium is associated with the second access frequency.

4. The method of claim 1, further comprising:
    associating the first storage medium with a first access frequency range, the first access frequency being within the first access frequency range;
    associating the second storage medium with a second access frequency range that is different from the first access frequency range, the second access frequency being within the second access frequency range;
    determining a third access frequency of the information of first type, the third access frequency being associated with a third period in the past; and
    transferring the information of first type to the first storage medium prior to a third point in time according to the determined third access frequency, the third point in time being associated with the third period in the past, the third access frequency being within the first access frequency range.

5. The method of claim 4, wherein the information of first type is transferred to the first storage medium from the second storage medium, wherein the information of first type is a data block having a first characteristic or a data group including a plurality of data blocks, each having the first characteristic.

6. The method of claim 4, wherein the storage unit further includes a third storage medium having a third access speed, the method further comprising:
    associating the third storage medium with a third access frequency range;

determining a fourth access frequency of the information of first type, the fourth access frequency being associated with a fourth period in the past; and transferring the information of first type to the third storage medium prior to a fourth point in time according to the determined fourth access frequency, the fourth period point in time being associated with the fourth period in the past, the fourth access frequency being within the third access frequency range.

7. The method of claim 4, wherein the first storage medium is a semiconductor device and the second storage medium is a hard disk device.

8. The method of claim 4, wherein the first storage medium is a hard disk drive and the second storage medium is an optical disk device or a magnetic tape device.

9. The method of claim 4, wherein the first storage medium is a semiconductor device, the second storage medium is a hard disk device, and the third storage medium is an optical disk device or a magnetic tape device, wherein the information of first type is a group of data having one or more common characteristics.

10. A method for managing data stored in a hierarchical storage unit of a storage apparatus, the storage unit including a first storage medium having a first access speed and a second storage medium having a second access speed, the first access speed being different from the second access speed, the method comprising:

providing information of first type in the first storage medium prior to a first period, the first storage medium being associated with a first access frequency range; and transferring at least a portion of the information of first type from the first storage medium to the second storage medium prior to a second period based on an expected access frequency during the second period, the second storage medium being associated with a second access frequency range, the expected access frequency being within the second access frequency range, wherein the expected access frequency is obtained by examining an access table maintained by the storage apparatus, wherein the access table associates a plurality of periods of time for the information of first type, each period being associated with a number of access requests received for the information of first type for that period, wherein each of the first and second periods is a recurring period.

11. The method of claim 10, further comprising:

determining a first access frequency corresponding to a first period in the past for the information of first type, the first access frequency being within the first access frequency range, the first period in the past corresponding to the first period, wherein the information of first type is provided within the first storage medium according to the first access frequency determined during the determining-a-first-access-frequency period;

determining a second access frequency corresponding to a second period in the past for the information of first type, the second access frequency being different than the first access frequency, the second period in the past corresponding to the second period, wherein the expected access frequency during the second period is derived based on the second access frequency; and storing the first and second access frequencies in a memory device associated with a storage controller in the storage unit, the storage controller configured to handle a data request to the storage unit, the memory device including access frequencies for a plurality of data blocks stored within the storage unit.

12. The method of claim 10, wherein the storage apparatus is a storage subsystem coupled to a host via a communication link or a storage system including a plurality of storage subsystems.

13. A storage apparatus configured to receive access requests from a host, the storage apparatus comprising:

a hierarchical storage unit including a first storage device having a first access speed and a second storage device having a second access speed, the first access speed being different than the second access speed;

a storage controller being coupled to the storage unit, the controller including a processor to handle a data transfer request to the storage unit; and a first computer readable medium including:

code for providing information of first type in the first storage medium prior to a first period, the first storage medium being associated with a first access frequency range; and code for transferring at least a portion of the information of first type from the first storage medium to the second storage medium prior to a second period based on an expected access frequency during the second period, the second storage medium being associated with a second access frequency range, the expected access frequency being within the second access frequency range, wherein the expected access frequency is obtained by examining an access table maintained by the storage apparatus, wherein the access table associates a plurality of periods of time for the information of first type, each period being associated with a number of access requests received for the information of first type for that period, wherein the first and second periods are recurring periods.

14. The storage apparatus 13, wherein the storage apparatus is a storage subsystem configured to be provided within a storage system including a plurality of storage subsystems, the storage controller being configured to maintain an access table that provides records of number of accesses made to data blocks in the storage unit.

15. The storage apparatus of claim 13, wherein the first computer readable medium further includes:

code for determining a first access frequency corresponding to a first period of past time for the information of first type, the first access frequency being within the first access frequency range, the first period in the past corresponding to the first period, wherein the information of first type is provided within the first storage medium according to the first access frequency determined dining the determining-a-first-access-frequency period; and code for determining a second access frequency corresponding to a second period in the past for the information of first type, the second access frequency being different from the first access frequency, the second period in the past corresponding to the second period, wherein the expected access frequency during the second period is derived based on the second access frequency.

16. The storage apparatus of claim 15, further comprising:

a memory device associated with the storage controller, wherein the computer readable medium further includes code for storing the first and second access frequencies in a memory device associated with a storage controller in the storage unit, the storage controller configured to handle a data request to the storage unit, the memory device including access frequencies for a plurality of data blocks stored within the storage unit.

17. The storage apparatus of claim 15, wherein the first storage medium is a semiconductor device and the second storage medium is a disk device provided in a RAID arrangement.

18. The storage apparatus of claim 15, wherein the first storage medium is a semiconductor of first type and the second storage medium is a semiconductor of second type.

19. The storage apparatus of claim 13, further comprising:

a second computer readable medium including:

code for transferring at least a portion of information of second type from the first storage medium to the second storage medium in anticipation of a change in an access frequency for the information of second type based upon occurrence of a predetermined condition or event.

20. The storage apparatus of claim 19, wherein the storage apparatus is a storage system including a plurality of storage subsystems, the first computer readable medium being provided in a first storage subsystem, the second computer readable medium being provided in a second storage subsystem.

* * * * *